(12) United States Patent
Keck

(10) Patent No.: US 7,685,955 B2
(45) Date of Patent: Mar. 30, 2010

(54) SHIP AND ASSOCIATED METHODS OF FORMATION AND OPERATION

(75) Inventor: Larry Bradly Keck, Winter Garden, FL (US)

(73) Assignee: Keck Technologies, LLC, Raleigh, NC (US)

( * ) Notice: Subject to any disclaimer, the term of this patent is extended or adjusted under 35 U.S.C. 154(b) by 145 days.

(21) Appl. No.: 11/695,932

(22) Filed: Apr. 3, 2007

(65) Prior Publication Data

US 2008/0092792 A1 Apr. 24, 2008

Related U.S. Application Data

(63) Continuation-in-part of application No. 11/548,472, filed on Oct. 11, 2006.

(51) Int. Cl.
*B63B 3/08* (2006.01)

(52) U.S. Cl. ..................... 114/77 R; 114/249

(58) Field of Classification Search ............... 114/61.1, 114/77 R, 246, 248, 249, 67 A, 67 R
See application file for complete search history.

(56) References Cited

U.S. PATENT DOCUMENTS

| | | | | |
|---|---|---|---|---|
| 3,035,536 | A * | 5/1962 | Archer ..................... | 114/77 R |
| 3,044,432 | A | 7/1962 | Wennagel | |
| 3,065,723 | A | 11/1962 | Tulin | |
| 3,145,681 | A * | 8/1964 | Nakagawa ................ | 114/77 R |
| 3,370,564 | A * | 2/1968 | Archer et al. ............. | 114/77 R |
| 3,485,200 | A * | 12/1969 | Iozza ........................ | 114/248 |
| 3,494,318 | A * | 2/1970 | Katsumura ................ | 114/246 |
| 3,557,741 | A * | 1/1971 | Teasdale ..................... | 114/248 |
| 3,610,196 | A * | 10/1971 | Lowry ........................ | 114/249 |
| 3,788,263 | A | 1/1974 | McDermott | |
| 3,799,100 | A | 3/1974 | Marriner | |

(Continued)

FOREIGN PATENT DOCUMENTS

WO WO 03/095297 11/2003

OTHER PUBLICATIONS

"Queer Ships" (undated prior art; citation not available).

(Continued)

*Primary Examiner*—Lars A Olson
(74) *Attorney, Agent, or Firm*—Ferdinand M. Romano, Esq.; Beusse Wolter Sanks Mora & Maire, PA.

(57) ABSTRACT

A ship and associated methods of formation and operation. In an example embodiment, a ship comprises a vessel for attachment to a second vessel. The vessel may comprise a catamaran hull including first and second parallel sides extending from a fore portion of the vessel to an aft portion of the vessel and defining a cavity when the vessel is afloat and a deck may be formed above the hull. A first connection component may be positioned along the fore portion and a second connection component may be positioned along the aft portion, the second component being of a connectable design, such that when a like second component is formed on another vessel, the like second component can be joined with the first component to effect a connection between the two vessels. A seal may be provided along the first component, positioned to sustain air pressure within the cavity when the like second component formed on the other vessel is joined to the first component.

12 Claims, 13 Drawing Sheets

U.S. PATENT DOCUMENTS

| | | | |
|---|---|---|---|
| 3,917,022 A | | 11/1975 | Brooks |
| 3,922,993 A | * | 12/1975 | Bludworth .................. 114/248 |
| 3,938,459 A | * | 2/1976 | Wilbanks et al. .......... 114/77 R |
| 3,938,461 A | * | 2/1976 | Marriner ..................... 114/249 |
| 4,137,987 A | | 2/1979 | Plackett |
| 4,535,712 A | | 8/1985 | Matthews |
| 4,660,492 A | | 4/1987 | Schlichthorst |
| 5,072,685 A | | 12/1991 | Kaucic |
| 5,105,898 A | | 4/1992 | Bixel |
| 5,111,763 A | | 5/1992 | Moerbe |
| 5,146,863 A | | 9/1992 | Ford |
| 5,176,095 A | | 1/1993 | Burg |
| 5,415,120 A | | 5/1995 | Burg |
| 5,601,047 A | | 2/1997 | Shen |
| 5,611,294 A | | 3/1997 | Burg |
| 5,727,495 A | | 3/1998 | Reslein |
| 5,746,146 A | | 5/1998 | Bixel |
| 6,167,829 B1 | | 1/2001 | Lang |
| 6,182,593 B1 | * | 2/2001 | Wierick ....................... 114/249 |
| 6,199,496 B1 | | 3/2001 | Burg |
| 6,293,216 B1 | | 9/2001 | Barsumian |
| 6,431,099 B1 | * | 8/2002 | Huang ...................... 114/77 R |
| 6,439,148 B1 | | 8/2002 | Lang |
| 7,013,826 B2 | | 3/2006 | Maloney |
| 2001/0039909 A1 | | 11/2001 | Smith |
| 2004/0134402 A1 | | 7/2004 | Schmidt |
| 2005/0211150 A1 | | 9/2005 | Maloney |

OTHER PUBLICATIONS

Wolff, Douglas "The Articulated Tug-Barge—A Case Study" (undated prior art; citation not available).

"ACV Trailers and Heavy Lift Systems", *Jane's Surface Skimmers*, 1976-77.

"Seasnake: an alternative oil tanker", *The Naval Architect*, Jun. 2003.

"Tug-Barge Couplers", Intercontinental Engineering-Manufacturing Corporation, www.intercon.corn/tug_barge.asp.

* cited by examiner

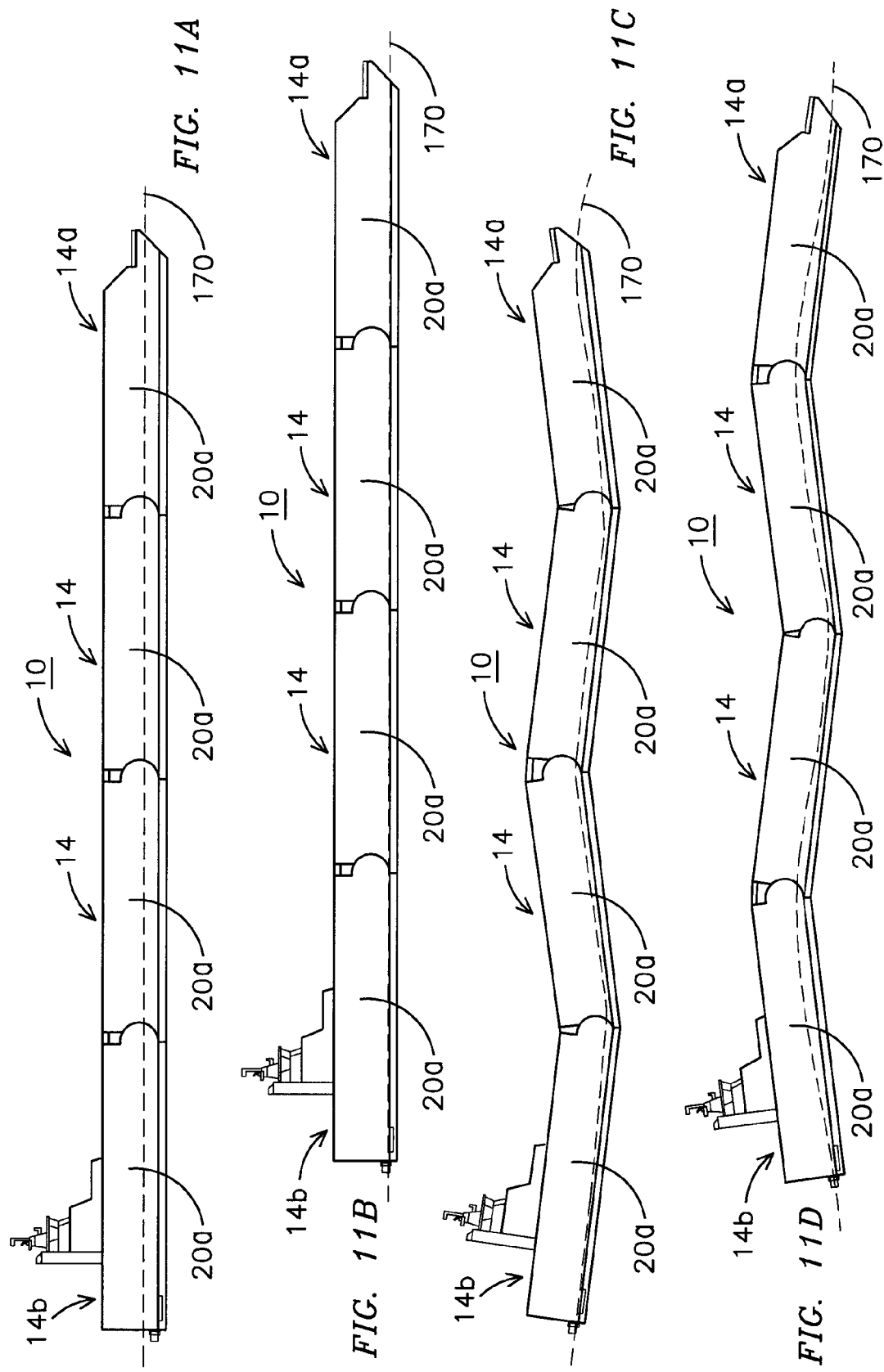

SHIP AND ASSOCIATED METHODS OF FORMATION AND OPERATION

RELATED APPLICATIONS

This application is a Continuation in Part of U.S. patent application Ser. No. 11/548,472 filed Oct. 11, 2006.

FIELD OF THE INVENTION

This invention relates generally to ships and, more particularly, to maritime designs and methods of transport.

BACKGROUND OF THE INVENTION

The transportation industry provides a wide variety of modes and routes with which to meet diverse demands. Selection can be based on numerous factors, including required delivery speed, security and the influence of transportation cost on the price of goods and services. When rapid, time-critical movement is required over a long distance, e.g., thousands of miles, air service has been the norm for both passenger and cargo transport. By way of example, rapid deployment of large military operations can require significant levels of air transport to place equipment and personnel where they are needed when they are needed. On the other hand, when commodity freight is being moved large distances, selection of the transportation mode is more cost sensitive, but often limited by the availability of low-cost choices. Depending on points of departure and destination, multiple low cost choices may be available, but there is often a need to accept the slowest transit speeds to minimize transportation expense and thereby assure cost competitive goods and services. The cost of freight transport is highly dependent on operational costs.

When moving large volumes of freight between different continents, sea transport has been the predominant mode due to cost, while passenger transportation is predominantly by air. Commerce along some large inland waterways may be predominantly by barge or freighter, being limited to commodity products or large cargo which is cost prohibitive or impractical to ship over land. Generally, the choice of water transportation for long distance shipment implies acceptance of relatively slow delivery speed. When multiple transportation modes are available to reach a freight destination the competitiveness of the maritime industry has been challenged. Other modes may be less fuel efficient but are still cost competitive while also providing greater speed and flexibility. For example, the rail and trucking industries are often capable of more quickly delivering products to final destinations while cargo shipped by water must often be transferred to rail cars or trailers to effect final delivery.

In order for transportation by water to be more competitive it would be desirable to improve speed and further reduce transportation costs. However, operating costs, often increase with speed, particularly for freightliners. Such limiting factors are rooted in the limits of achievable hydrodynamic efficiencies for vessel designs. It has long been known that the efficiency of movement through water is a function of a ship's length to beam (L/B) ratio. There have been continual efforts to improve the design of ships with high L/B ratios for operation at relatively high speeds. Several classes of vessels have been so optimized.

Limitations in achievable performance stem from inherent structural issues associated with performance under high structural loads and bending moments such as experienced in high sea states. Strength and flexure issues associated with long, slender ships are addressed with provision of a more robust, typically heavier, longitudinal girder system relative to that required for relatively short ships. Generally, the length of the ship dictates the size and weight of the longitudinal girder system. With advanced analysis capabilities to model behaviors of hulls under dynamic loading, and considering the length of the ship as a single beam for modeling of behavior, girder systems must be of sufficient stiffness and mass to assure acceptable operation in the presence of expected bending moments. It is desirable to develop designs for long and slender vessels (e.g., with L/B>10) which avoid the complexities and added mass conventionally required, as such can enable a more cost efficient ship which can operate more economically. Such improvements can render maritime transportation more suitable for a variety of commerce and non-commercial needs. What is needed is a set of solutions which render maritime operations faster, more flexible, and more cost efficient. With such greater capabilities maritime transportation can be a more acceptable alternative to transportation needs that otherwise must be addressed with air or land-based systems.

BRIEF DESCRIPTION OF THE INVENTION

In accord with an embodiment of the invention a method of operating a ship includes the combination of providing multiple vessels over water with each having a hull section defining a cavity extending between a fore portion of the vessel and an aft portion of the vessel with portions of the hull section extending along starboard and port sides to define walls extending into the water to define first and second opposing walls along the cavity while the cavity extends to a first opening in the hull section positioned along the fore portion of the vessel and to a second opening in the hull section positioned along the aft portion of the vessel. A chamber is provided from among cavities by joining the first opening in the hull section of a first of the vessels to a second opening in the hull section of a second of the vessels.

An embodiment of a method of forming a ship may include providing a plurality of vessels each having a hull defining a cavity suitable for movement of air between a fore portion and an aft portion of the vessel when the vessel is afloat, and providing a plurality of first and second connection components so that a first component of a first of the vessels is connectable with a second component of a second of the vessels According to several examples, a vessel is provided for attachment to a second vessel. The vessel may comprise a catamaran hull including first and second parallel sides extending from a fore portion of the vessel to an aft portion of the vessel and defining a cavity when the vessel is afloat and a deck may be formed above the hull. A first connection component may be positioned along the fore portion and a second connection component may be positioned along the aft portion, the second component being of a connectable design, such that when a like second component is formed on another vessel, the like second component can be joined with the first component to effect a connection between the two vessels. A seal may be provided along the first component, positioned to sustain air pressure within the cavity when the like second component formed on the other vessel is joined to the first component.

Also according to other embodiments of the invention, a vessel having a fore portion and an aft portion, further includes a hull providing a cavity extending between the fore portion and the aft portion for movement of air therethrough when the vessel is afloat. A first connection component may be positioned along the fore portion and a second connection component may be positioned along the aft portion, the second component being of a design such that when a like second component is formed on another vessel, the like second component can be joined with the first component to effect a connection between the two vessels.

According to another embodiment, a ship includes a power system and a plurality of vessels each capable of occupying a first draft when afloat without aid of the power system and a second draft smaller than the first draft with aid of the power system. Multiple coupling mechanisms are each operable to connect one vessel to another vessel so that the plurality of vessels can form a single assembly and so that power can be transferred between vessels to move the vessels through water in a tandem arrangement.

In a method of configuring multiple vessels for transport in tandem a first of the vessels is attached to a second of the vessels with limited degree of freedom so that the first vessel can only undergo displacement relative to the second vessel about a single axis of rotation.

BRIEF DESCRIPTION OF THE DRAWINGS

The invention is explained in the following description in view of the drawings wherein:

FIGS. 11A through 11D are elevation views illustrating ship 10 in various modes of operation;

Like reference characters denote like or corresponding parts throughout the figures. In order to emphasize certain features relating to the invention, certain features shown in the figures may not be to scale.

DETAILED DESCRIPTION OF THE INVENTION

Before describing in detail example embodiments according to the invention, it is noted that the invention includes a novel and non-obvious combination of elements and method steps. So as not to obscure the description, details of elements and steps pertinent to the invention are emphasized in the figures and written description, without illustrating in the figures certain associated elements and steps which are otherwise conventional or which will be readily apparent to those skilled in the art.

Figure 1:
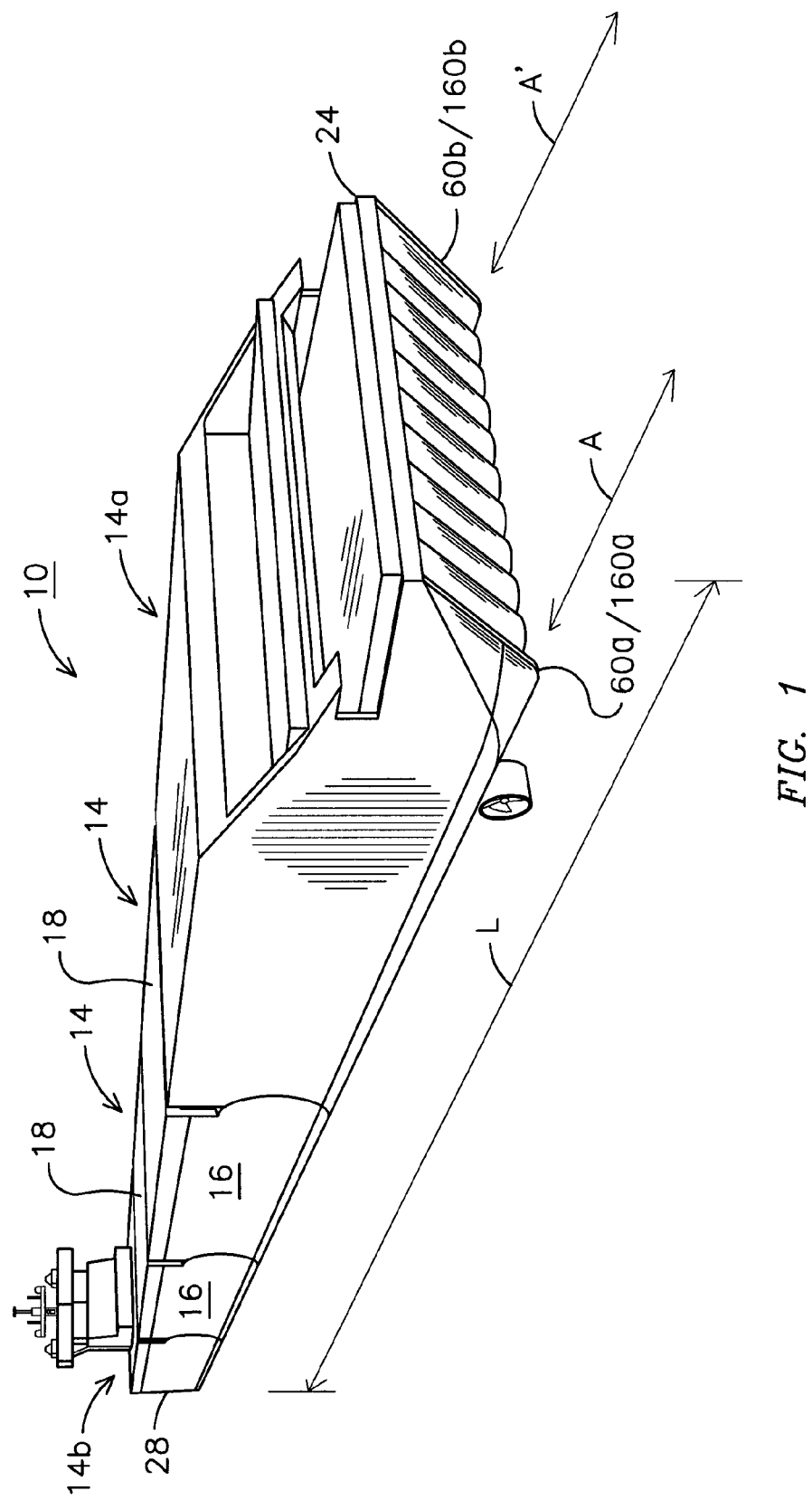
FIG. 1 provides a partial perspective view of a ship according to an embodiment of the invention.

With reference to the simplified perspective view of FIG. 1, there is shown, according to one embodiment of the invention, an exemplary ship 10 comprising multiple vessels 14 arranged in a serial assembly for tandem movement as one unit or ship. Adjacent ones of the vessels 14 are flexibly coupled to each other to allow variations in pitch of each vessel. Yet the vessels are coupled in a manner allowing transfer of motive power from vessel to vessel, thereby enabling movement of the entire series of vessels in a controllable manner and as a single ship, e.g., somewhat analogous to movement of a railroad train comprising a series of cars each coupled to another. The ship 10 includes a fore-most vessel 14, designated 14a, a rear-most vessel 14, designated 14b, and multiple intermediate vessels between the vessels 14a and 14b. Although only four vessels are shown in the figure the ship 10 may include fewer or a larger number of vessels 14, e.g., ten or more vessels. As indicated for intermediate ones of the vessels 14, each of the illustrated vessels includes a hull portion 16 and a platform structure 18 which may comprise multiple decks and superstructures. Like components among the intermediate vessels as well as the vessels 14a and 14b are designated with like reference numbers.

As used herein to describe a feature of a ship, the term length refers to a distance measurable along a direction parallel with the dimension of the ship or its hull which is substantially aligned with the primary direction of intended ship motion or thrust; and the term width refers to a distance measurable along a direction normal to the length. The lengths and widths of the vessels 14 may vary considerably. For purposes of providing an example range of dimensions, the lengths of commercial vessels according to the embodiments described may vary from less than 30 m to over 300 m and the widths may vary from less than 20 m to over 40 m.

Figure 2:
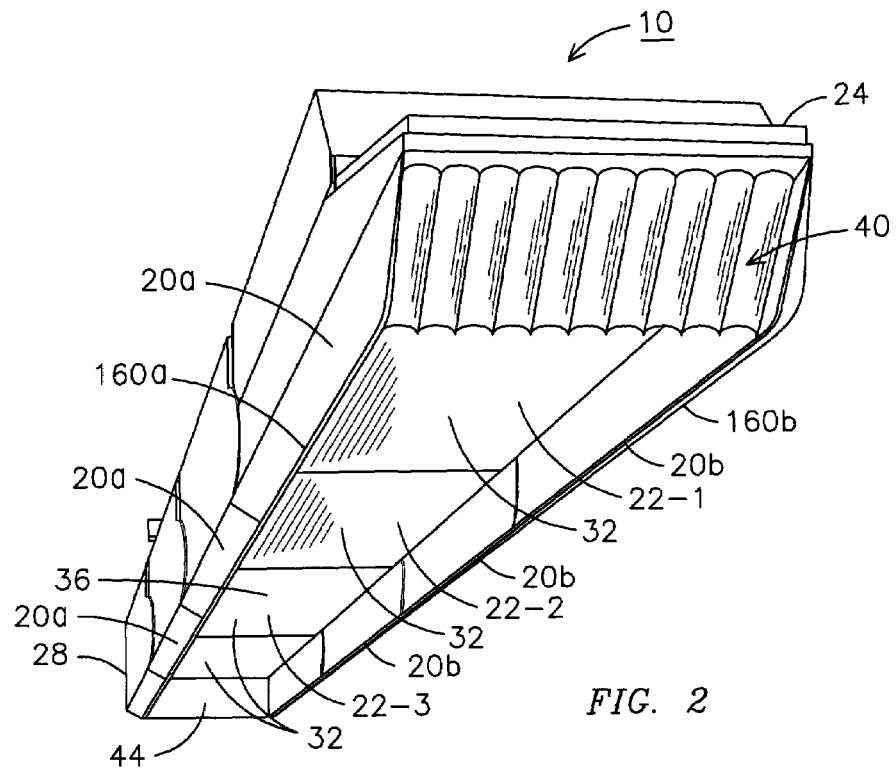
FIG. 2 is a view of the ship of FIG. 1 in a view showing an underside of the ship.

FIG. 2 is a perspective view taken from beneath the ship 10 illustrating that each hull portion 16 comprises a pair of opposing and substantially parallel catamaran hulls 20, each hull in a pair designated as a starboard hull 20a or a port side hull 20b. A lowest deck 22 of the platform structure 18 is formed of individual decks 22-1, 22-2, 22-3 etc. on different vessels 14 which are each connected between a pair of the hulls 20a and 20b. The surface of the deck 22 which faces downward toward the water, as well as the component surfaces of the decks 22-1, 22-2, 22-3, etc. which face downward toward the water, are referred to as wet decks. Generally, the hull portion 16 of each vessel 14 has a length extending from a fore portion 24 to an aft portion 26 of the vessel. See FIG. 3. In this embodiment, all of the hulls 20a extend along a first straight axis A and all of the hulls 20b extend along a second straight axis A' parallel to the axis A. The ship 10 extends an overall length L, comprehending individual lengths of the plurality of hulls 20a along the axis A and the plurality of hulls 20b along the axis A' among the multiple connected vessels 14. Hulls 20 positioned along each axis extend substantially toward one another with nominal or minimal spacing therebetween to accommodate required clearance for movement and sealing materials as described herein. In other embodiments, hulls of different vessels that are aligned along a common axis may be spaced substantially apart from one another, e.g., by a meter or more with optional sealing materials such as a bellows arrangement, extending between the hulls of different vessels to provide isolation of cavities formed between opposing hulls 20a and 20b if it is desired to provide a pressure differential between the cavities relative to atmospheric pressure. The ship length, L, extends from the ship bow 28, along the fore portion 24 of the vessel 14a, to the ship stem 28, along the aft portion 26 of the vessel 14b.

The hulls 20a and 20b of each vessel 14 are parallel with one another, and each vessel 14 has a width B (see FIG. 5) measurable as the distance between the outside substantially parallel surfaces of opposing hulls, 20a and 20b, i.e., as measured from an exterior-facing surface along the port side of one hull to an exterior-facing surface along the starboard side of the opposing hull. For embodiments where each of the vessels in the ship has the same beam width, B, the ship may be described as having a uniform beam width B.

The view of FIG. 2 illustrates that each pair of hulls 20a and 20b of each vessel 14 provides a cavity region 32 having an associated volume of air when the vessel is on water. With the vessels 14 coupled in a tandem arrangement, the series of cavity regions 32 are in open communication with one another to form a chamber 36, extending along multiple vessels 14, which is multiple times the volume associated with any individual cavity region. The illustrated chamber 36 extends from the ship bow 24 to the ship stem 28 and is substantially enclosed by the series of hulls 20a and 20b in combination with a bow seal 40 positioned along the bow 24 of the ship and a stem seal 44 positioned along the stem 28 of the ship.

Figure 3:
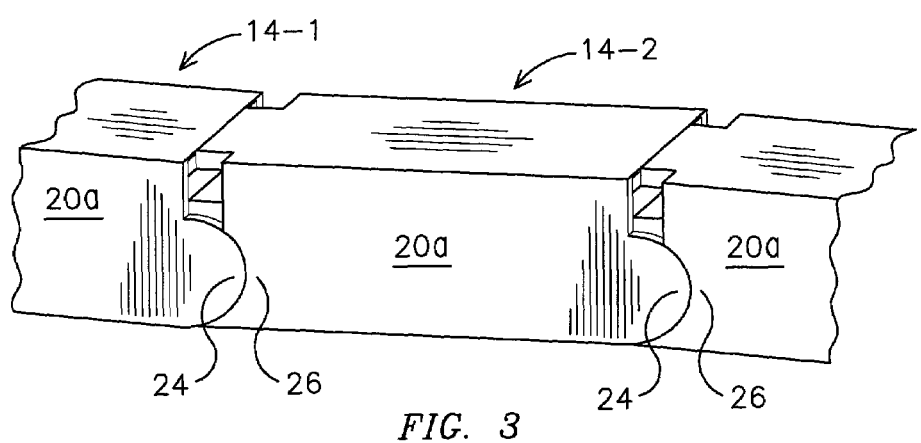
FIG. 3 illustrates a series of vessels coupled to one another to form a ship according to the embodiment of FIG. 1.
Figure 4:
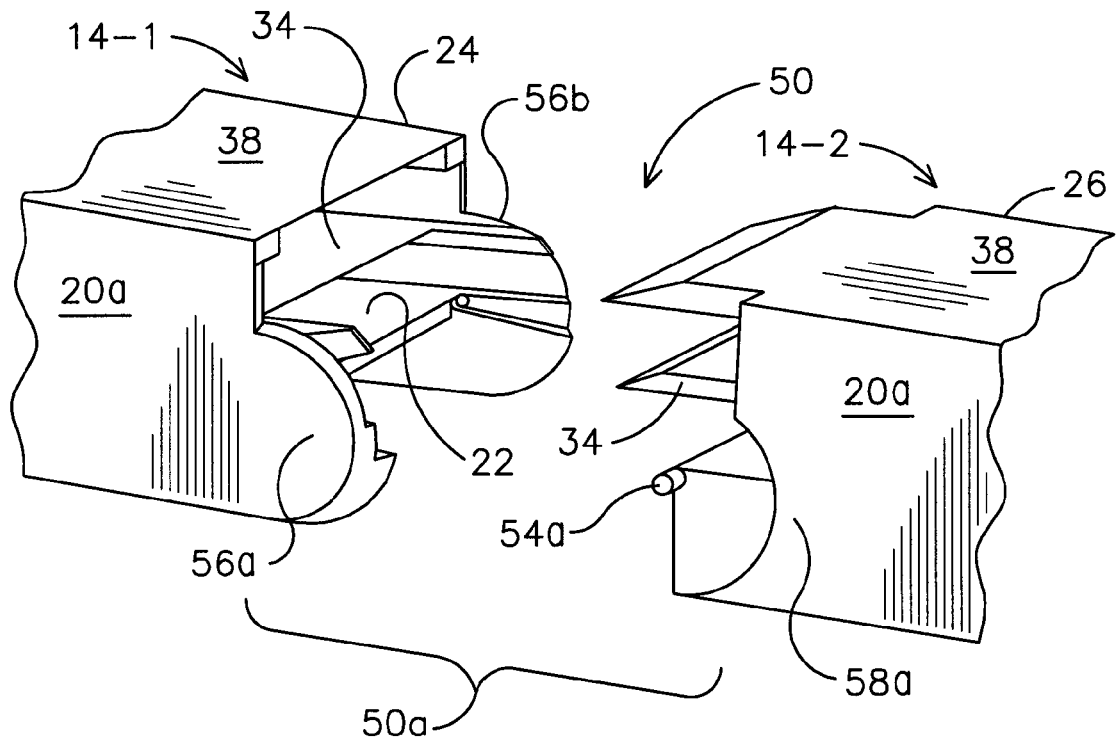
FIG. 4 is a partial perspective view illustrating hull portions and other select elements forming an exemplary mechanism that effects coupling of the vessels shown in FIG. 3.

The vessels 14 forming the ship 10 may be coupled in a variety of ways depending on the degrees of freedom desired for each vessel with respect to each adjacent vessel to which it is joined. Depending on how the vessels are coupled to one another, each vessel 14 may experience heave, or changes in pitch, yaw or roll, relative to an adjacent vessel, about the point of coupling between the vessels. FIG. 3 illustrates a series of the vessels 14 coupled to one another in a configuration suitable for operation of the ship 10. The perspective view of FIG. 4, illustrates elements of one exemplary coupling mechanism 50 that effects coupling of the first and second adjacent vessels 14-1 and 14-2 shown in FIG. 3. Portions of the hulls 20a and 20b positioned along the aft portion 26 of the second vessel 14-2 are, respectively, each adapted to rotatably engage with portions of the hulls 20a and 20b along the fore portion 24 of the first vessel 14-1. With respect to FIGS. 4 and 5, the vessels 14-1 and 14-2 are shown in spaced-apart relation for clarity of illustration. This illustration shows additional components of the platform 18. Above the lowest deck 22 there is an exemplary second deck 34 which includes a weather cover 38 formed thereover. In this embodiment, when the coupling mechanism 50 is fully engaged the coupling is the interface between the two vessels, i.e., between the fore portion 24 of the first vessel 14-1 and the aft portion 26 of the second adjacent vessel 14-2. Each coupling mechanism 50 comprises two couplings 50a and 50b, each of a three component hinge-type arrangement. A fore region component on a hull on one vessel is connectable with an aft region component on a hull of another vessel with a locking pin. See, also, FIG. 5b. Each coupling 50a, on the starboard side of the vessels, comprises a first pin 54a which links a fore region 56a of the hull 20a of the vessel 14-1 to an aft region 58a of the hull 20a of the vessel 14-2. This arrangement enables a rotational, hinge-like movement of the hull fore region 56a of the first vessel 14-1 about the pin 54a and with respect to the aft region 58a of the vessel 14-2. Similarly, the couplings 50b, each on the port side of the vessels 14-1 and 14-2, comprises a second pin 54b which links a fore region 56b of the hull 20b of the vessel 14-1 to an aft region 58b of the hull 20b of the vessel 14-2. These pairs of three component arrangements enable a rotational, hinge-like movement of the hull fore region 56b of the first vessel 14-1 about the pin 54b and with respect to the hull aft region 58b of the vessel 14-2.

The pins 56a and 56b may be stationary with respect to the aft regions (58a, 58b) while the fore regions (56a, 56b) rotate, but other arrangements will be apparent. The coupling mechanism 50 is one of several embodiments which can provide the ship 10 with a continuous, yet articulated or jointed, first hull 60a comprising the plurality of hulls 20a, e.g., along the axis A, and provide the ship 10 with a continuous, yet articulated or jointed, second hull 60b comprising the plurality of interconnected hulls 20b, e.g., along axis A'. In this sense, the ship 10 is an articulated or jointed vessel. In other embodiments the ship 10 may include one or more additional articulated hulls, e.g., incorporating mechanisms 50, positioned between the hulls 60a and 60b and extending the length L of the ship.

The general concept of an articulated vessel has been explored in the past. See, for example, U.S. Pat. No. 3,938, 461. However, prior implementations have not provided a series of vessels which, when coupled for tandem motion, collectively behave as a single ship. For example, the ship 12 can be steered and maneuvered as a single vessel although it comprises multiple vessels 14. Several embodiments of the invention achieve this effect by allowing changes in pitch among individual vessels while constraining other motion such as roll or yaw. According to several embodiments, rotational movement and translational movement along certain axes is controlled or prohibited to prevent yaw or roll while allowing rotational movement that enables changes in pitch in response to vertical bending moments. Thus individual vessels can undergo changes in pitch while limiting or prohibiting other motions that would result in undesirable behaviors. As an example, under high sea state conditions it may be most preferred to limit or fully constrain changes in roll and yaw among individual vessels while allowing changes in pitch. On the other hand, on relatively calm inland waterways it may be desirable to allow individual vessels to undergo changes in both pitch and yaw while constraining changes in roll. The following examples illustrate a system which constrains changes in roll and yaw while allowing changes in pitch.

Figure 5B:
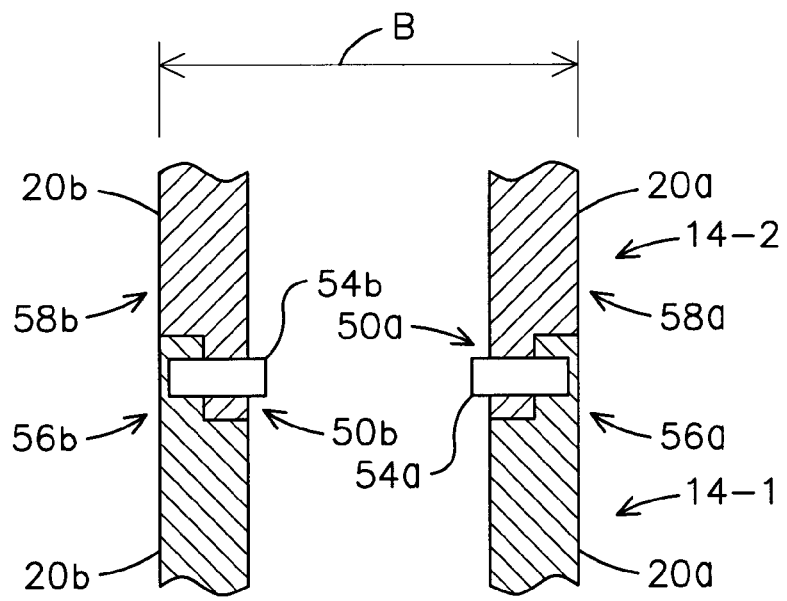
FIGS. 5a and 5b are partial plan views in schematically illustrating portions of hulls associated with the vessels shown in FIG. 3.
Figure 5A:
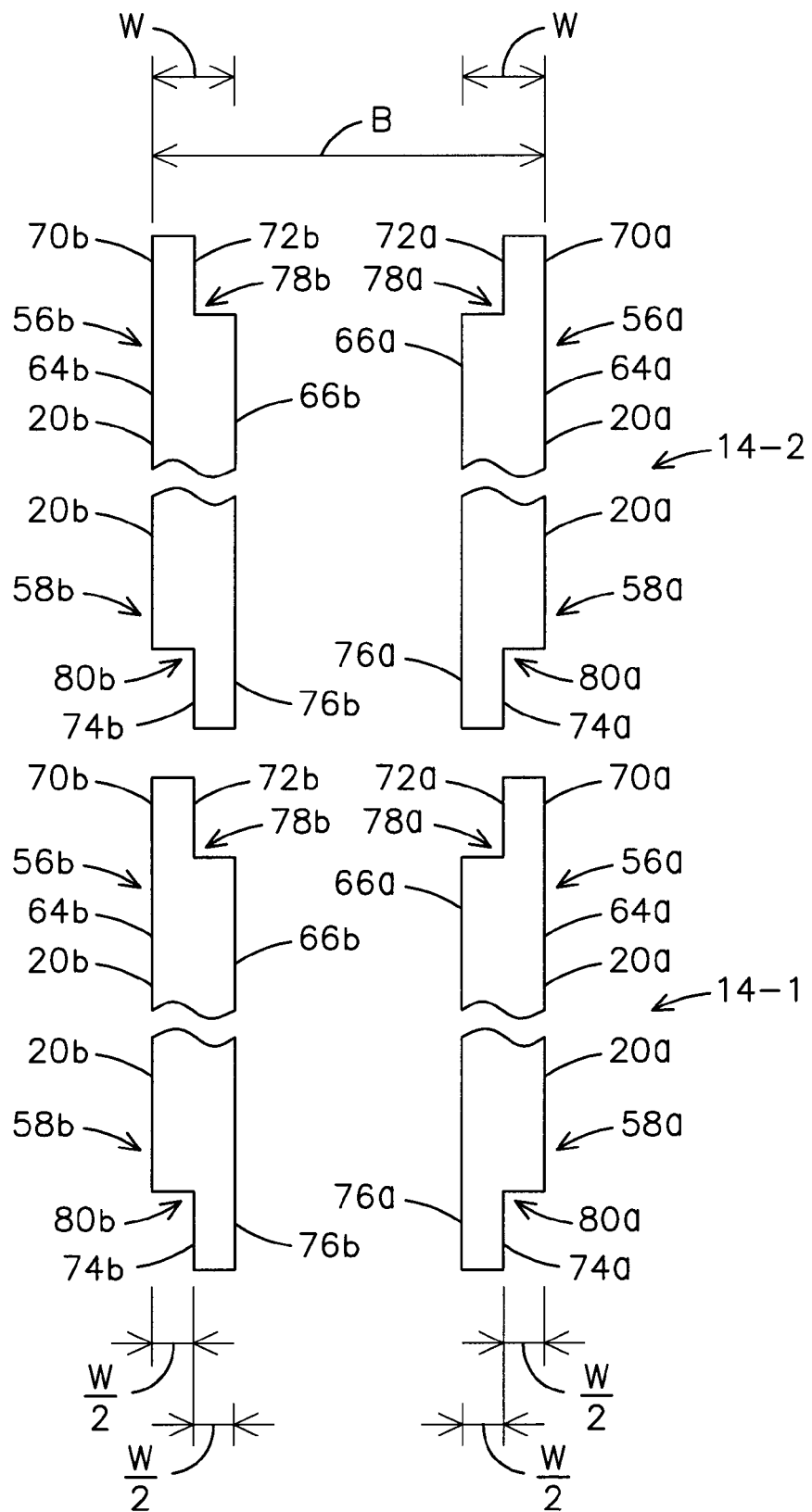

FIGS. 5a and 5b are simplified views of the pairs of hulls 20a and 20b of the vessels 14-1, 14-2 and 14-3. FIG. 5a is a plan view showing two pairs of hulls 20a and 20b in spaced-apart relation as they are being joined to provide a mechanically coupled arrangement of the vessels 14-1 and 14-2. The figures illustrate features of an exemplary design incorporating the coupling mechanism 50 to join the hulls 20 and form the larger hulls 60a and 60b of the ship 10. In this example, the hulls 20 of adjacent vessels are coupled to one another with the same mechanism 50 at each interface between two vessels 14 but combinations of different coupling mechanisms, e.g., providing varying degrees of freedom, are contemplated. When the hulls 20 are coupled together with the mechanism 50, a profile of substantially fixed width can be maintained along the entire length of the two articulated ship hulls 60a and 60b. One simplified example of a hull design and associated coupling mechanism 50 which results in the articulated hulls 60a and 60b is now described. The hulls 20a and 20b are illustrated as though they have each been formed with a pair of opposing vertical sidewalls so that each of the four side walls are positioned in a plane parallel with the other planes. It is to be understood that in other embodiments of the invention the hull sidewalls may have curvature with respect to such planes and with respect to the axes A and A', and the hulls may include various symmetric or non-symmetric features.

Numerous additional variations in hull design are contemplated while nonetheless incorporating the concepts shown in the simplified illustrations of FIG. 5.

To effect the consistent profile of substantially fixed hull width along each of the axes A and A', each of the hulls 20 has a uniform width W over the majority of the hull length, wherein the width W is measurable from an outside plane surface 64a of each hull 20a to an inside plane surface 66a of the same hull, and from an outside plane surface 64b of each hull 20b to an inside plane surface 66b of the same hull; while at both the fore regions and the aft regions of the hulls 20, the widths of those portions of hulls on one vessel that rotate with respect to portions of hulls on adjoining vessels are reduced. As used herein with respect to a hull 20, the term outside surface refers to a surface that faces outward or away from the ship 10, and the term inside surface refers to a surface that faces inward or toward another hull 20. For a given vessel, the inside surface 66a of the hull 20a faces the inside surface 66b of the hull 20b. With the portions of hulls that rotate with respect to other portions of hulls and having reduced width, e.g., widths reduced to W/2, the engaging portions which rotate with respect to one another can be lapped to create a combined width, e.g., W, thereby providing a substantially uniform overall width for each of the hulls 60a and 60b including about the region of overlap.

The fore regions 56a of the hulls 20a each include a plane outside surface portion 70a (facing away from the vessel) and a plane inside surface portion 72a (facing the hull fore region 56b) with a width, W/2, measured from the plane portion 70a to the plane portion 72a. Similarly, the fore regions 56b of the hulls 20a each include a plane outside surface portion 70b (facing away from the vessel) and a plane inside surface portion 72b (facing the hull fore region 56a) with a width, W/2, measured from the plane portion 70b to the plane portion 72b. The aft regions 58a of the hulls 20a each include a plane outside surface portion 74a (facing away from the vessel) and a plane inside surface portion 76a (facing the hull aft region 58b) with a width W/2 measured from the plane portion 74a to the plane portion 76a. Similarly, the hull aft regions 58b of the hulls 20b each include a plane outside surface portion 74b (facing away from the vessel) and a plane inside surface portion 76b (facing the hull aft region 58a) with a width W/2 measured from the plane portion 74b to the plane portion 76b.

In view of the foregoing geometry, the fore regions 56a and 56b and the aft regions 58a and 58b each have a profile width W/2 which is half of the otherwise uniform hull width W over the majority of the length of the hulls 20. Consequently, with this reduction in hull width at the hull fore and aft regions, the fore and aft regions can lap one another to form a hinge joint between vessels which results in a smooth, continuous transition region between adjoining hulls 20 having a width W. In this example the width reductions along the individual fore and aft regions 56a, 56b, 58a and 58b, relative to the full hull width W are abrupt, resulting in angled, notch-shape recesses which are referenced in the figures as fore recesses 78a and 78b (adjacent the hull fore regions 56a and 56b, respectively, each extending along one of the surfaces 72a and 72b), and aft recesses 80a and 80b (adjacent the hull aft regions 58a and 58b, respectively, each extending along one of the surfaces 74a and 74b). With the hull fore regions 56a and 56b each extending toward one another a distance W/2 from a respective plane outside surface portion 70a or 70b.

The recesses 78a and 78b about the fore regions 56a and 56b can each receive one of the aft regions 58a and 58b, also of width W/2, and the recesses 80a and 80b about the aft regions 58a and 58b can each receive one of the fore regions, such that fore and aft regions form lapped pairs (56a, 58a) and (56b, 58b) with each surface 72a positioned against a surface 74a and each surface 72b positioned against a surface 74b. See FIG. 5b. Although the surfaces 72a, 72b, 74a and 74b are described as plane surfaces, it is contemplated that such lapping of fore and aft regions of different hulls can be effected with surfaces that are not formed in parallel planes and such surfaces may be angled, beveled or curved with respect to vertical or horizontal planes and may include additional contours along surfaces which lap one another or along regions adjacent lapped surfaces.

Figure 6:
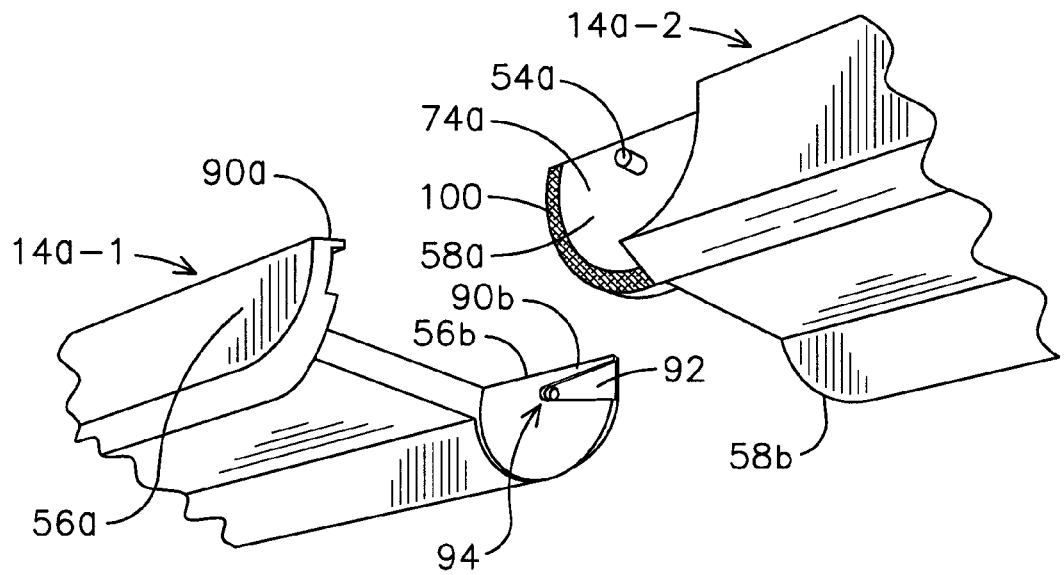
FIG. 6 is a partial perspective view of an alternate configuration of hull portions for effecting coupling of the vessels shown in FIG. 3.

A feature of the illustrated embodiment is that each lapped combination of a hull fore region and a hull aft region, e.g. regions 56a and 58a, or regions 56b and 58b, provides a profile having a combined width equal to the hull width W. This results in a substantially consistent width W along the entire length of each ship hull 60a and 60b. Although the hulls 60a and 60b have been described with opposing sides of the same hull being substantially parallel to one another, and having substantially constant widths W, this has been for simplicity of illustration. Generally, opposing sides of the same hull may occupy non parallel planes or may follow contours along the hull length or along planes orthogonal to a central axis along the length. Although the hulls 60a and 60b have been described as having fore and aft regions having individual widths w/2 such that when lapped the combined widths equal W, other proportions may be preferred. For example, the aft regions of the hulls 20 may have reduced widths of W/3 relative to a full hull width W in portions thereof which lap while the fore regions of the hulls 20 may have a width (⅔)W relative to the full width W. The combined width of the two portions may still be W. Other proportions as well as angled and contoured shapes are contemplated. while it is desirable that the lapped components generally provide a width W. FIG. 6 is a partial perspective view of the hulls 20 according to an alternate configuration wherein the fore regions 56a and 58b are angled to receive the aft regions 58a and 58b.

FIG. 5b is a partial sectional view of the vessels 14-1 and 14-2 illustrating the pairs of hulls 20a and pairs of hulls 20b shown in FIG. 5a. The view is taken along a plane passing through the pins 54a and 54b. Pairs of the hulls 20a and 20b are shown engaged to one another with a hinge pin 54a connecting hull fore region 56a to hull aft region 58a and with a hinge pin 54b connecting hull fore region 56b to hull aft region 58b. The illustrated pins 54a and 54b are shown as extended a sufficient width into both of the hulls in a lapped pair to assure to securement and reliable rotational movement responsive to forces which change the pitch of the vessels. The pins 54a and 54b may be of varied designs. In the illustrated embodiment the pins may be fixedly secured to or through the fore regions 56a and 56b (or to the aft regions 58a and 58b) such that the aft regions may be swung, via a hinge arrangement, into place so that each pin passes into an aperture within an aft region. Alternately, the aft regions may include guides or angled slots for placing the pins at appropriate positions therein as the aft regions are moved into the recesses 78a and 78b and the fore regions are moved into the recesses 80a and 80b. The pins 54a and 54b may also be of the moveable or retractable type, controlled, for example, by actuators or hydraulics or manual means. Such hinge designs have been used, for example, to connect a tug-barge unit, with the bow of the tug coupled to a stern notch of a cargo-carrying barge by means of retractable pins. Such available hinge designs, available from Bludworth Cook and Intercontinental Manufacturing, have been used to allow one monohull vessel, i.e., a tug, to pitch with respect to another monohull vessel, i.e., a barge. Generally, the starboard and port sides of one vessel may be fitted with pins which are initially in a retracted configuration and which are extended once the vessels are aligned for coupling. Such hinge style couplings permit changes in pitch while constraining the vessels from separately undergoing changes in roll and yaw.

Figure 7:
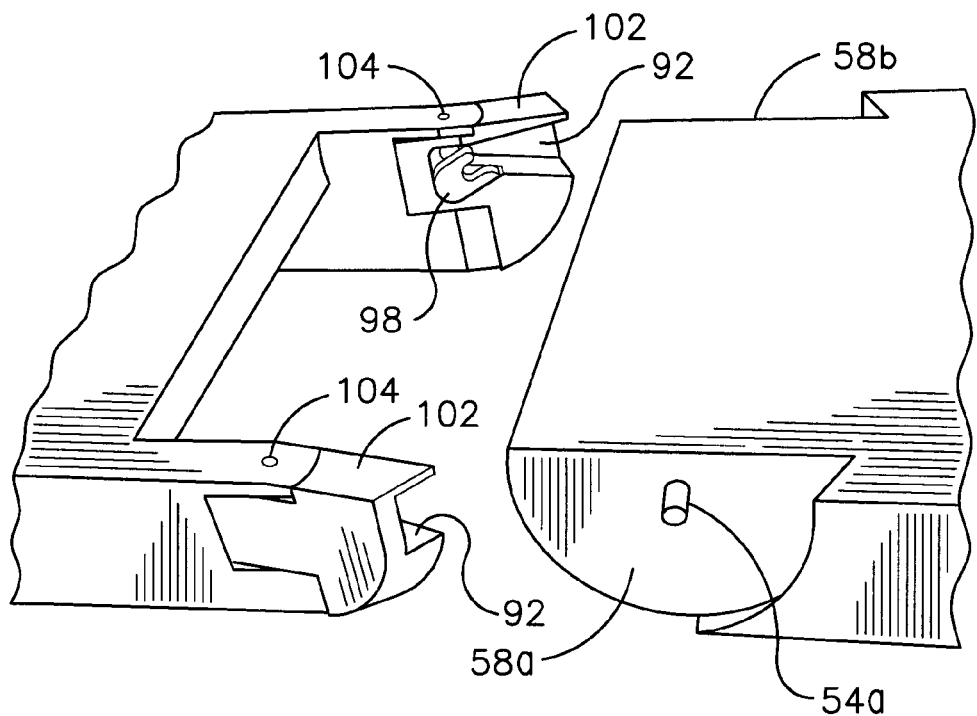
FIG. 7 is a partial perspective view illustrating hull portions and other select elements of a coupling mechanism according to an alternate embodiment to effect a coupling of the vessels shown in FIG. 3.

According to another embodiment, the perspective view of FIG. 6 illustrates two spaced-apart vessels 14a-1 and 14a-2, functionally similar to the vessels 14, incorporating a variation of the coupling mechanism 50. The hull fore regions 56a and 56b each are formed with an angled wall surface 90a or 90b along the surfaces 72a and 72b (schematically shown in FIG. 5a) to facilitate centering of the aft hull portion 26 of the vessel 14a-2 with respect to the fore hull portion 56a of the vessel 14a-1. To further assist with alignment and placement of the pins 54a and 54b, each surface 90a and 90b includes an engagement slot 92 to guide movement of a pin to the desired position 94. Once the pins are positioned for engagement, locking mechanisms, such as the rotatable mechanism 98 shown in FIG. 8, retain each pin in place. Alternately, retraction-expansion mechanisms may further displace each pin along a longitudinal direction (i.e., along the direction of the width of the vessels) into receiving volumes, such as receiving cylinders, within the hull fore regions 56a and 56b. The receiving volumes may include sealed bearings or other low friction assemblies to facilitate continual rotational movement between the pins and the hull regions 56a and 56b. FIG. 6 also illustrates an optional, exemplary seal 100 along an outside surface 74a of a hull aft region 58a. Generally seals of varying designs may cover any or all of the surfaces 72a, 72b, 74a and 74b in varying degrees to reduce or minimize movement of air through the interface between coupled vessels when the chamber 36 has a positive pressure. The seal 100 may be a brush seal or may be formed of a synthetic woven material, e.g., polypropylene, or may be of a rubber-like or low-friction material and may be inflatable, e.g., in an annular or semi-annular shape, to pneumatically vary the degree of sealing. FIG. 7 illustrates a further variation in design of the hull fore regions 56a and 56b with each incorporating a wing section 102 rotatable about a pivot assembly 104. Each wing section includes an engagement slot 92 as described with respect to FIG. 6. Motion of the wing sections about the pivot assemblies may be powered.

Figure 8:
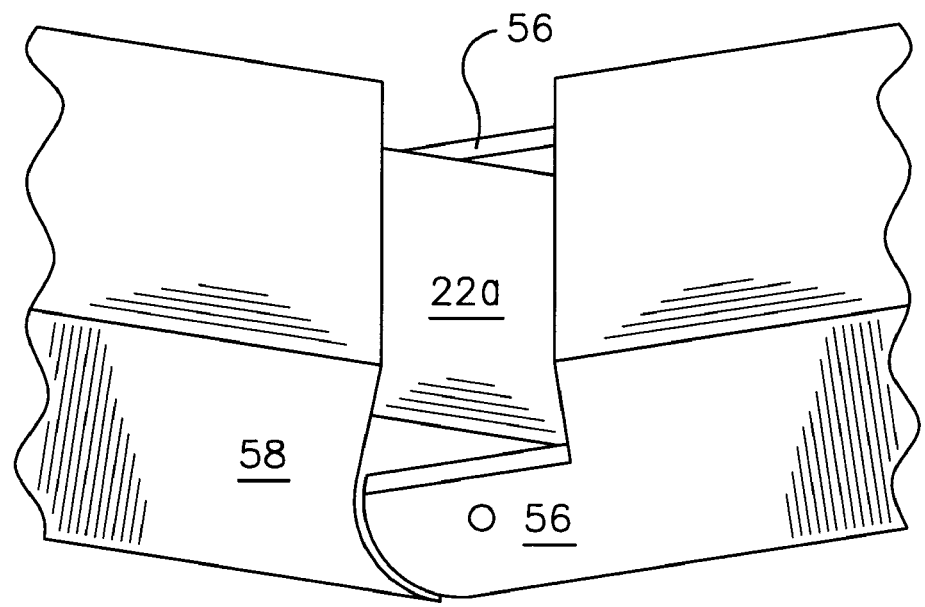
FIG. 8 is a perspective view of a three dimensional model illustrating a hinge arrangement.
Figure 9A:
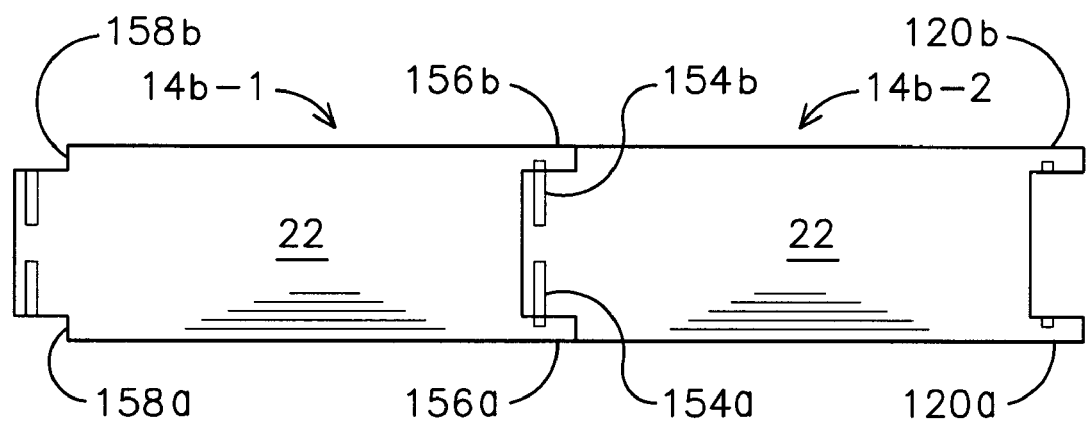
FIGS. 9A-9D are simplified plan and perspective views illustrating a coupling mechanism according to another embodiment.

The embodiments so far described incorporate a split hull connection configuration, i.e., wherein the fore and aft portions of adjoining hulls are reduced in width in order to be lapped against one another and effect connection with a pin. Numerous other arrangements are contemplated. For example, the deck at the aft of one vessel may extend beyond the hull to connect directly with the deck or the hulls of another vessel via, for example, retractable pins that extend from one of the decks. FIG. 8 is a perspective view of a three dimensional model illustrating a hinge arrangement connecting a lowest deck level 22a along an aft region 58 of one vessel with fore regions 56 of hulls 20 located on the port and starboard sides of a second vessel. FIG. 9A is a simplified plan view showing such an arrangement for two spaced-apart vessels 14b-1 and 14b-2, functionally similar to the vessels 14, but incorporating another variation of the coupling mechanism 50. For purposes of illustrating features of this embodiment the figure shows components that are in different planes and which would not be visible in a view taken along a single plane. Portions of the vessel hulls are shown at the fore regions 24 of the vessels.

The vessel hulls, designated 120a and 120b differ from the hulls 20a and 20b in that they can be of substantially constant width over the entire length of each to form the ship hulls 160a and 160b. The hulls 120a and 120b do not incorporate a lapped configuration wherein fore regions of hulls on one vessel are hinged directly to aft regions of hulls on an adjoining vessel. Rather, the hull fore regions, designated 156a and 156b and the hull aft regions 158a and 158b can be of the same width, W, as the other portions of the hulls. At the fore ends 24 of the vessels 14b-1 and 14b-2, the hulls 120a and 120b extend beyond the deck 22, while at the aft ends 26 the deck 22 extends beyond the hull aft regions, designated 158a and 158b. The hull fore regions of the vessel 14b-1 are designed to receive retractable-extendable pins 154a and 154b which are mounted at the aft of the deck 22 of the vessel 14b-2.

Figure 9B:
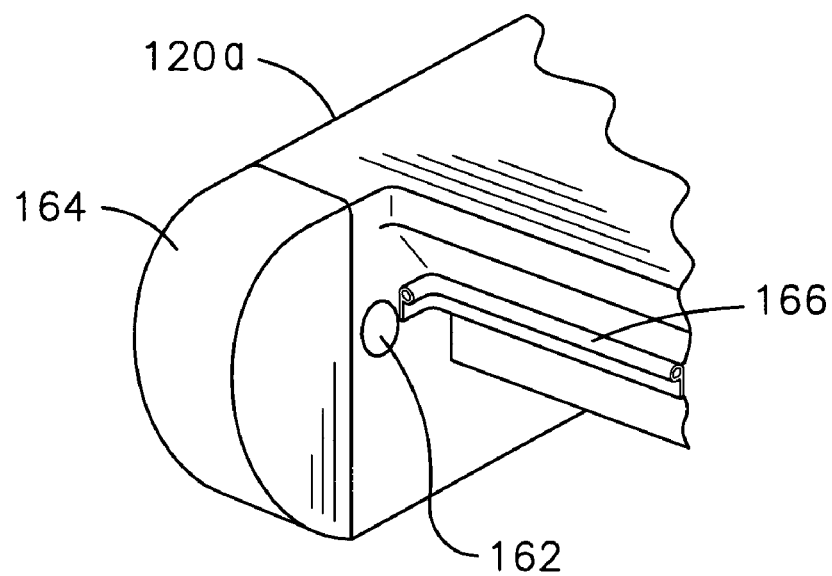
Figure 9C:
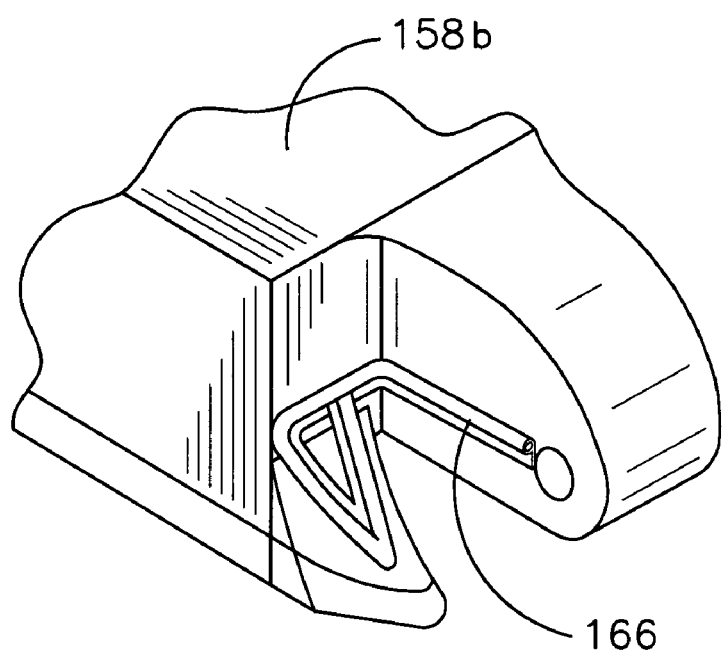
Figure 9D:
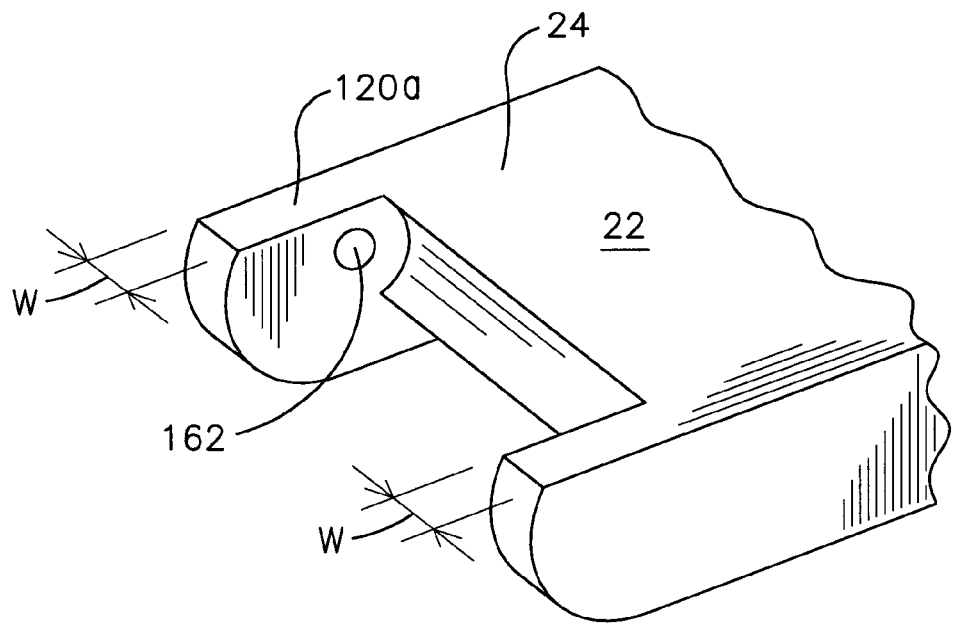

FIG. 9B illustrates fender material 164, e.g., an elastomer, applied to an end of a hull 120a at the fore region 156a and a P-seal 166 applied along the bow of the deck 22 between the fore regions 156a and 156b to reduce or minimize movement of air through the interface between pairs of coupled vessels when the chamber 36 has a positive pressure. FIG. 9C illustrates further positioning of P-seal material 166 along the end of a hull 120b at the aft region 158b to further reduce movement of air out from the chamber 36. FIG. 9D is a partial perspective view of the embodiment of FIG. 9A illustrating the fore region 24 of the vessel 14b-1 (without fender material and seals) and a receiving cylinder 162 formed in the fore region 156a of the hull 120a into which a pin 154a may slide to couple the deck of an adjoining vessel 14b-2 thereto. The cylinder 162 may include bearings to facilitate non-binding, low resistance, rotational movement of the pin relative to the hull.

The illustrated embodiments address limitations in conventional ship design. Generally, as the length of a vessel increases, conventional design practices have required that the structure be strengthened to withstand higher moments of loading. Vessels are designed to exhibit sufficient stiffness to counter, for example, vertical bending moments due to seaway. More generally, a large vessel can incur a combination of low frequency wave-induced vertical bending moments (transverse with the length of the hull) and higher frequency lateral forces resulting from the impact of waves against the hulls. There is a non-linear relationship between increases in vessel length and the structural mass that must be added to the vessel in order to provide necessary stiffness to the hull structure. This has made it especially costly to provide very long ships, and it has become accepted that, to meet structural requirements under the most adverse sea conditions, the mass per unit length will increase as the overall length of a vessel is increased. Thus the need for the structure to withstand various types of stresses has limited the ability to provide vessels which are both longer and more lightweight. Without sufficient structural resilience a vessel can flex and oscillate in response to bending moments sometimes placing the hull out of alignment and possibly resulting in failure.

These conventional constraints are overcome by providing an articulated ship comprising multiple vessels flexibly coupled to one another for tandem movement. With regard to the exemplary hulls 60a, 60b comprising multiple segments each formed of a catamaran-like hull 20a or 20b, a feature of the invention is that the length and beam width of individual hulls 20 can be based on desired performance parameters, including weight, buoyancy, operating speed and efficiency, while not limiting the overall length of the ship. Thus the structural requirements for the hulls 60 that form the ship 10 are not primarily based on the overall length of the hulls 60, but, rather, are largely based on the length of the individual hulls 20 and design specifications established for the individual vessels 14 which form the ship 10. To overcome constraints relating to bending moments, the hulls are connected to one another in a manner which allows for movement of individual ones of the vessels 14, so that the individual hulls 20 are responsive to bending moments. For example, at the interface between coupled vessels there can be translational or rotational degrees of freedom which permit responsiveness of one or more vessels to external forces. With the coupling mechanism 50, in one embodiment the ship 10 allows for constrained movement of individual vessels in response to vertical bending moments, and thus there can be significant change in vessel pitch. This allows the individual vessels to be displaced instead of requiring the ship 10 having to behave as a rigid and more heavily built structure. The vessels of the ship 10 can be displaced in response to bending moments (e.g., induced by variations in the contours of a water surface) while a ship with a rigid hull would be designed to withstand such moments with less flexure.

As illustrated in FIGS. 2 and 4, the ship 10 may include a bow seal 40 and a stern seal 44. In combination with these seals, the ship may be further equipped to function as a Surface Effect Ship (SES), the design of which overcomes limitations of ship length and performance that have been characteristic of this vehicle class. The seal 100 of FIG. 6 and the various other seals shown in the figures can facilitate retention of air pressure in the chamber 36 to provide lift to the hulls 60a and 60b.

In the past, Surface Effect Ships have generally included fore and aft skirts about a single pair of rigid, parallel catamaran hulls to sufficiently enclose the air volume between the hulls and enable pressurization that results in formation of an air cushion for elevating the hulls. Generally, with respect to prior SES designs as well as the embodiments illustrated herein, an elevation of hulls in a SES with pressurized air is referred to as an on-cushion state. This is to be contrasted with an off-cushion state in which the elevation of the hulls determined by vessel buoyancy. An on-cushion configuration, relative to an off-cushion state, enables the ship to cruise at a relatively high speed with relatively low water resistance.

In prior SES designs the hulls have been rigid girder systems extending the entire length of the ship. With such a rigid structure efforts to scale up the size of the ship have been problematic. For example, under high sea state conditions there can be significant changes in wave contours relative to the keel of a vessel, e.g., due to presence of tall wave crests. Such situations can place portions of the keel above the trough of a wave, resulting in a loss of pressure needed to support the air cushion. Consequently, prior SES designs have generally been limited to hull lengths less than 100 meters. Under varied sea conditions surface effect ships with shorter keel dimensions have a reduced frequency of losing air cushion under high sea state conditions, e.g., sea states of five or higher. Generally, for this reason, surface effect ships are not designed with lengths greater than 300 m.

With the ship 10 functioning as an SES, an air cushion can be generated along the entire chamber 36 to place the ship in an on-cushion state resulting in elevation of the hulls 60a and 60b relative to a water line. FIGS. 11A through 11D are elevation views of the ship 10 deployed as a surface effect ship and illustrating the starboard sides of the component vessels 14 during various modes. In FIG. 11A the vessels 14 are shown in level trim with an exemplary water line 170 along the hulls corresponding to an off-cushion state and a first draft. FIG. 11A may correspond to the vessels configured in an SES mode or the ship otherwise comprising a series of vessels 14 forming the hulls 60a and 60b. FIG. 11B illustrates the same vessels in level trim relative to the water line 170 when the ship 10 is configured in an SES mode and in an on-cushion state characterized by a second draft. As shown in FIGS. 11C and 11D, the ship 10 readily exhibits changes in pitch at each interface between component vessels. Although FIGS. 11C and 11D illustrate the ship 10 as a surface effect ship in an on-cushion state, similar changes in pitch among the vessels 14 can occur in an off-cushion state and when the ship 10 is not deployed as a surface effect ship. The illustrations show possible dynamic orientations of individual vessels. The changes in pitch are not necessarily to scale or specific to a particular speed of the ship 10. The magnitude of such pitch changes can be a function of both the sea state and ship velocity.

Figure 12:
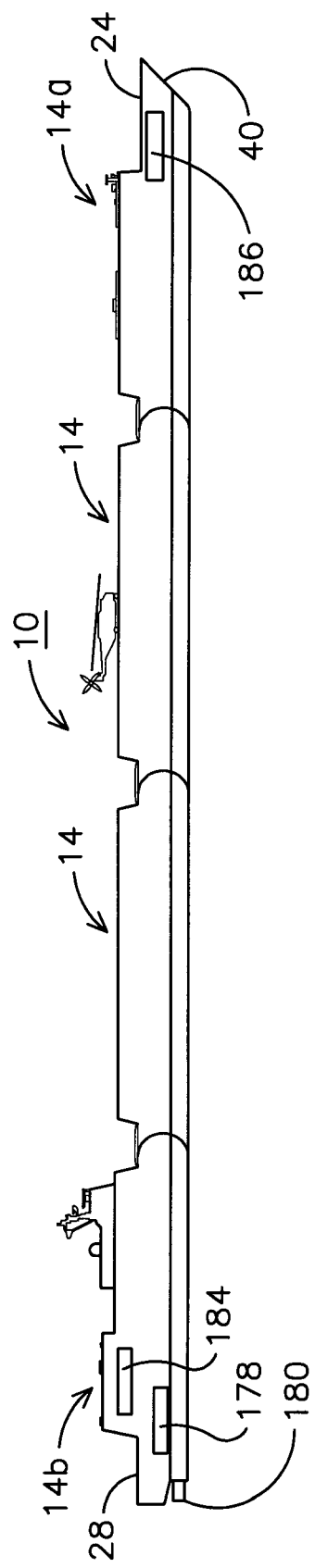
FIG. 12 illustrates, in a side elevation view, the ship of FIGS. 1-4 deployed as a surface effect ship.
Figure 13A:
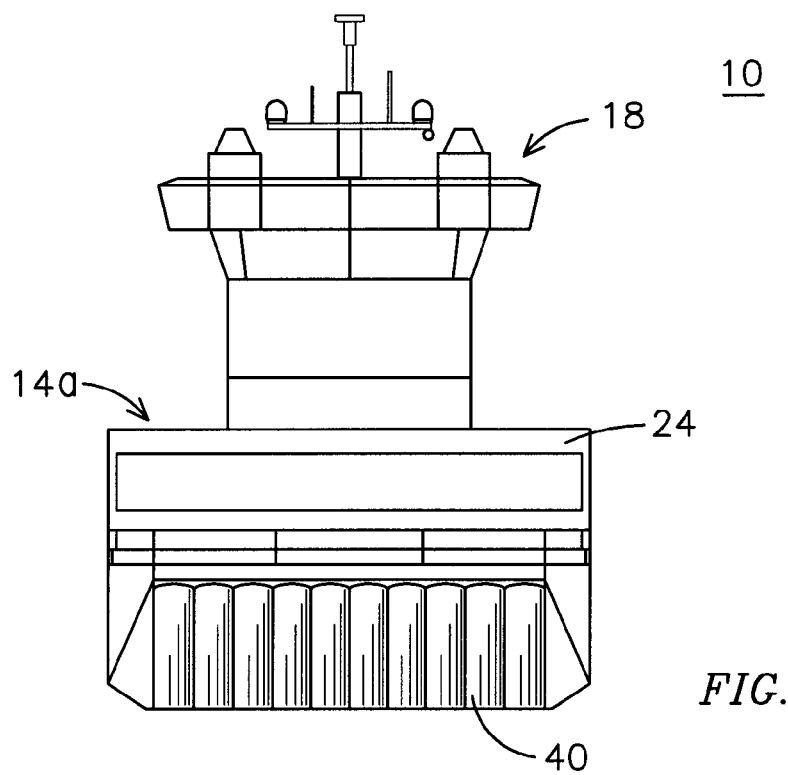
FIGS. 13A and 13B are elevation views of the ship shown in FIG. 12 illustrating the bow and stern.
Figure 13B:
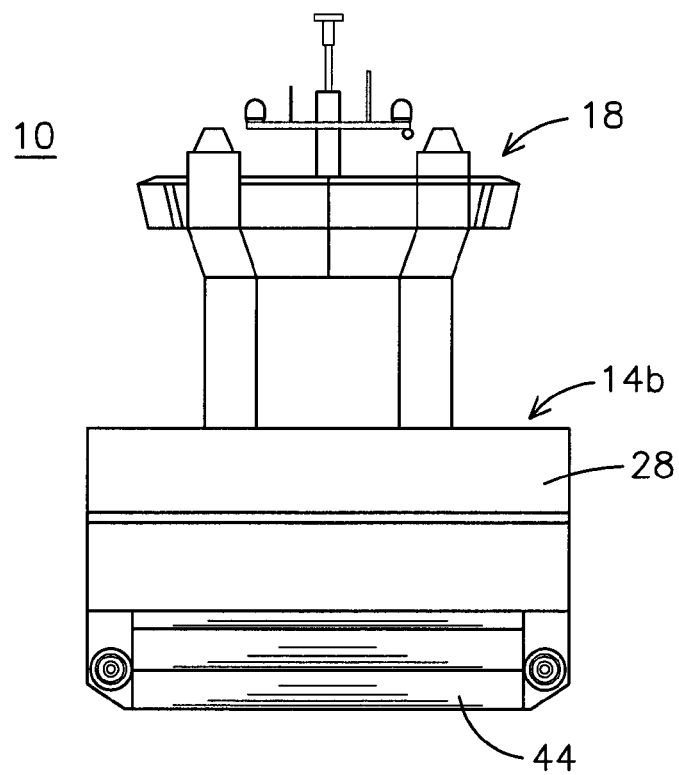

FIG. 12 further illustrates, in a side elevation view, features of the ship 10 when deployed as a surface effect ship. In FIG. 12, like reference numbers are used to refer to like vessels and components shown in other figures. The ship 10 as shown in FIG. 12 illustrates additional features including various platform structures, a main propulsion system 178 and water jets 180 located in the rear-most vessel 14b. Aft lift systems 184 are also located in the vessel 14b while forward lift systems 186 are positioned near the bow in the vessel 14a. The lift systems are positioned relatively close to the bow seal 40 and stem seal 44 so that if, during on-cushion movement, seaway displaces one of the seals causing partial depressurization in the chamber 36, the lift systems can quickly force the seal back into a sealing position against the water surface. FIGS. 13A and 13B are elevation views of the ship 10 shown in FIG. 12, again configured as an SES and illustrating, respectively, the bow 24 and the stem 28.

A feature of the invention is enablement of a flexible ship in several regards. An important load parameter in the structural design of ship hulls is the vertical bending moment due to seaway, which causes changes in pitch. With a ship formed of individual vessels interconnected with a degree of freedom (e.g., rotational freedom to permit differential heave or changes in pitch) along the interface between vessels, it is possible to provide a relatively long and slender ship with less structural mass than would be required if the ship were made of a continuous rigid hull portion, whether a mono-hull or multi-hull, e.g., catamaran, design. Further, the achievable length of such a ship is not limited by structural requirements of the hull portion because the hull portions of individual vessels in the ship can be of a size optimized for the application, structural efficiency, minimum mass, carrying capacity speed, economy or other factors. In fact, the length of the ship and the number of interconnected vessels forming the ship can be arbitrarily large and, based on structural considerations, without limit.

In another regard, the invention enables custom attachment and arrangement of vessels as well as selective "drop off" of individual vessels at multiple points of destination. Ships according to the disclosed design options are, essentially, modular constructs which can be assembled and disassembled to suit purposes of a carrier company. They may comprise mixes of uses among the different vessels which have heretofore been less practical. For example, a ship may include a variety of vessels of different designs to carry containers loadable with a crane, roll-on cargo and vehicles, liquids such as petroleum products, and passengers. The potential high speed capability combined with this carrying flexibility allows a transportation company to assure a customer base of rapid and reliable shipping while accommodating short notice changes in carrying capacity. For example, if the company establishes a regular schedule over a route for high speed delivery, it can adapt to fluctuations in the amount of cargo space in demand or the type of cargo or the number of passengers by changing the type and number of vessels in the ship on relatively short notice.

In still another regard, multiple embodiments of the invention enable efficient transport of persons or cargo in a surface effect ship of arbitrarily large length. As a relatively long and slender ship, e.g., having a L/B of 10:1 or higher, economies of scale can be achieved, also allowing for improved fuel efficiency and transport speeds ranging on the order of 50 to 100 knots while even higher speeds are technically attainable.

Another feature of the invention relates to an improved capability of operation under high sea state conditions. By way of example, as ships according to the invention travel into large wave fronts, e.g., with crests on the order of 10 meters or taller, the initial vessel, e.g., 14a, can be optimized in design to encounter such a condition with recognition that as subsequent vessels in the tandem series travel over the wave front the magnitude of changes in pitch will diminish. Thus the latter vessels in the series will undergo smaller vacillations. The hulls of the ship 10 can respond to bending moments and, for a given length of the ship, e.g., over 100 meters, a continuous air cushion chamber, extending the length of the ship, is not susceptible to air cushion pressure losses of the type which are known to occur for rigid hull designs when displacements, e.g., due to changes in pitch, are of such magnitude as to break the seal of the air cushion region. The ship 10 is capable of sustaining air cushion pressure under a wide variety of sea conditions.

While various embodiments of the present invention have been described, these are provided by way of example only. The illustrated hull portions 16 of vessels 14 are of a catamaran design, but other hull designs may be used in accord with principles and teachings of the invention. For example, the hull portions 16 may be of a trimaran design. The vessels 14 may be formed with three or even more hulls wherein hulls of different vessels are formed along common axes to provide three or more ship hulls like the hulls 60a and 60b. In surface effect ships of this design, the volumes between pairs of ship hulls can be pressurized to provide lift.

Numerous other variations are contemplated for designs based on rotation of fore or aft regions of the hulls 20. For the design shown in FIG. 4, the fore and aft regions of the hulls may have circular shapes that come close together when two vessels are coupled. That is, one circular shaped surface can nest along another circular shaped surface with each surface following a contour along a different one of two concentric circles. That is, the circular arcs may differ slightly in radius, to allow for tolerances and insertion of sealing materials, while each may be aligned for rotation about the same concentric center. This arrangement includes placing the pin substantially along the common geometric center of the concentric circles so that each arc rotates about the same center point. See FIG. 10A which is a side elevation view of the spaced-apart vessels 14-1 and 14-2 shown in FIG. 4.

The hull fore region 56a includes a circular surface contour 192 along a circle of radius $a_1$ and centered about a receiving cylinder 194. The hull aft region 58a includes a circular surface contour 198 along a circle of radius $a_2$ and centered about a pin 200 which is positionable in the receiving cylinder 198. In order to bring the surfaces close to one another and allow room for sealing material, $a_2$ is slightly greater than $a_1$. The pin 200 may be retractable and extendable to selectively enter the cylinder after the hull surface contours 192 and 198 are brought close together in the process of coupling the vessels to one another. For this embodiment the pin 200 is shown to be positioned on the hull aft region 58a at the center of the circle along which the surface contour 198 extends.

Figure 10A:
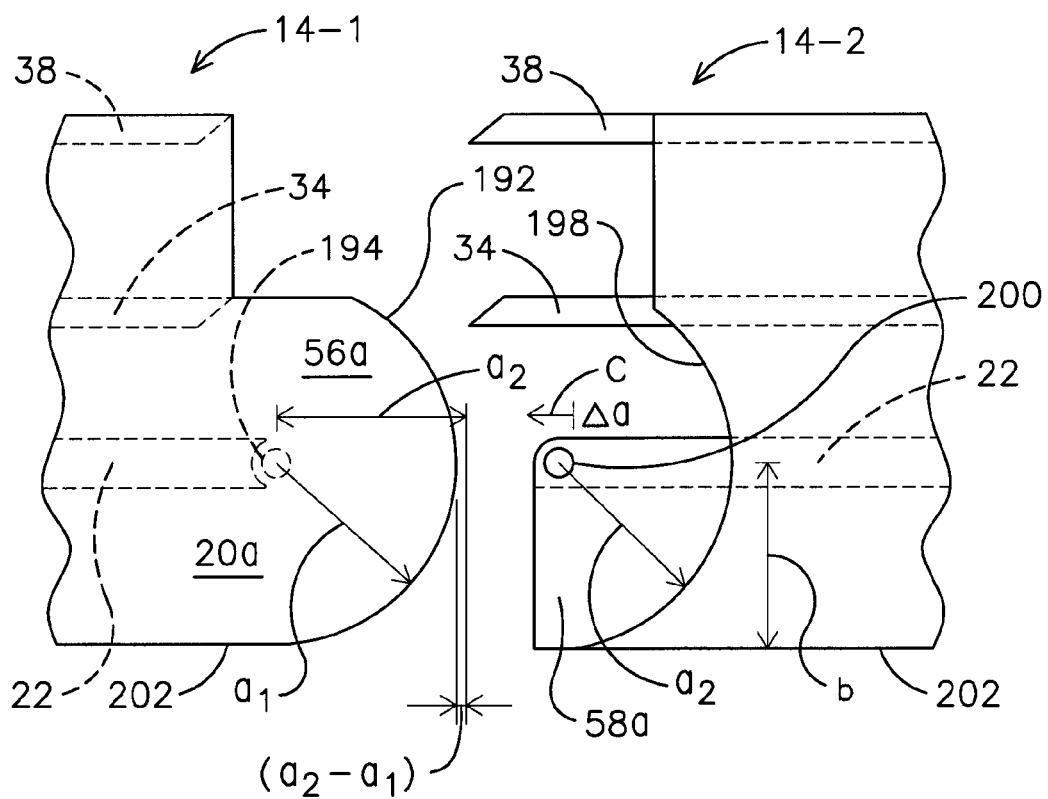
FIGS. 10A-10E are side elevation views illustrating possible variations in hull designs according to the invention.
Figure 10B:
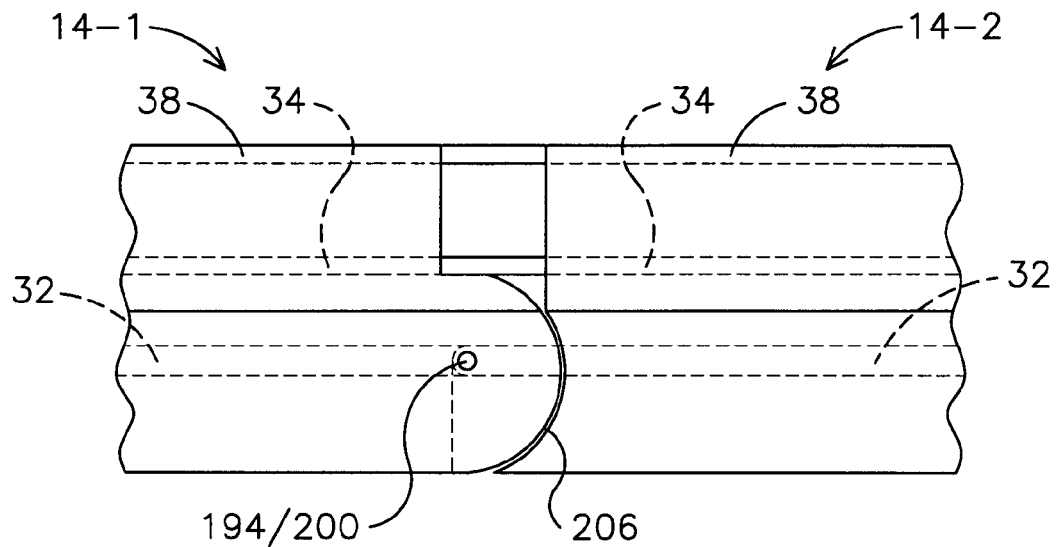
Figure 10C:
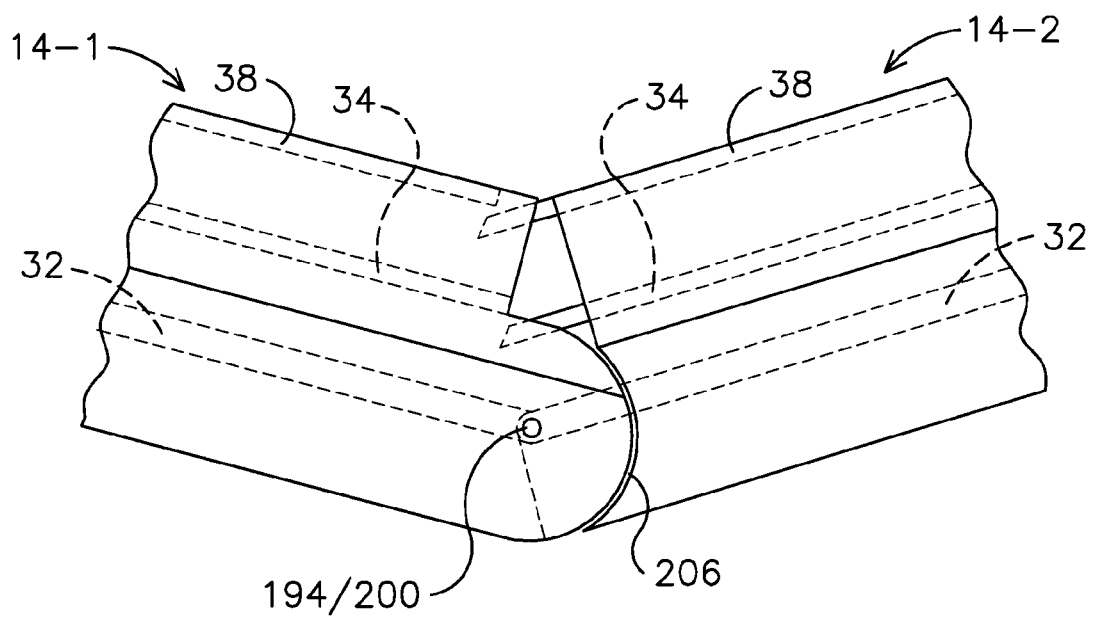

Concealed portions of the lowest deck 22, the second deck 34 and the weather cover 38 are shown with phantom lines to illustrate relative positions of the contours 192 and 198. The distance b, from the receiving cylinder 194 to the keel 202 and the distance from the pin 200 to the keel 202 are shown to be about the same, e.g., approximately $a_1$ or $a_2$, but may be substantially less than or greater than $a_1$ or $a_2$. Vessels 14 constructed in accord with FIGS. 3, 4 and 10A are further illustrated in FIGS. 10B and 10C wherein the circular contour 206 corresponds to the combination of concentric surface contours 192 and 198 as well as any voids or sealing materials therebetween.

Figure 10D:
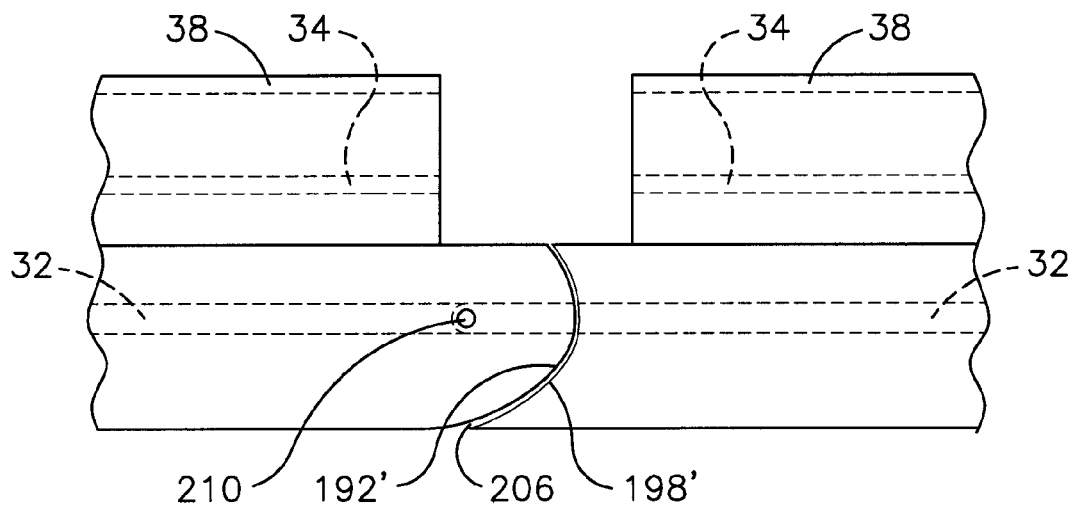
Figure 10E:
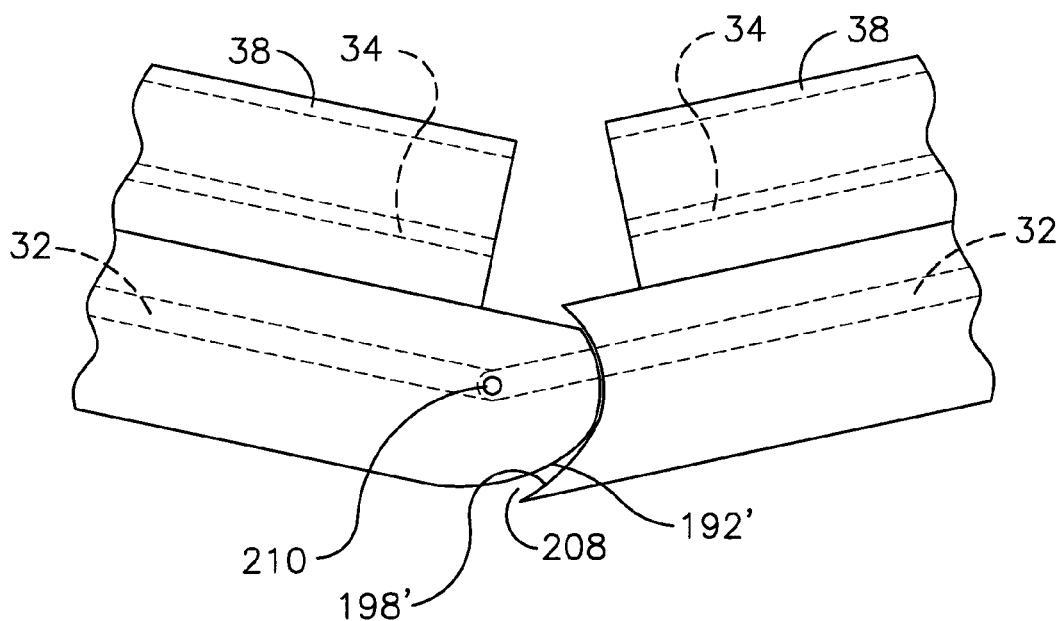

With reference again to FIG. 10A, in other embodiments the position of the pin 200 may be laterally displaced a distance c along the lowest deck 22 or may be moved up or down relative to the lowest deck 22 by changing the distance b relative to the keel 202. With reference to FIG. 10D, when the pin 200 is so displaced relative to the center of the circle along which the surface contour 198 extends, the contours, referenced as 192' and 198', no longer follow the paths of concentric circles but rotate about a point 210 where the pin 200 is placed in the receiving cylinder 194. Further, the surface contours may be modified as shown in FIG. 10D to follow non-circular curves which can come relatively close to one another when the vessels are running with no pitch. With these variations, movement of the contours 192' and 198' may emulate movement of cams. As shown in FIG. 10D a modest gap 206 may exist between the contours 192' and 198' which may be closed with sealant material to avoid loss of pressure in the chamber during an on-cushion state. However, as the vessels display significant sag, a larger gap 208 can form which may require additional insertion of sealing material to reduce loss of pressure during the on-cushion state. See FIG. 10E. When the vessels experience such relatively large pitch there may be a significant but temporary pressure loss. For this reason, the hull connection configuration described with reference to FIGS. 10B and 10C may be advantageous.

The hinge-like couplings permit rotational freedom about an axis normal to the two axes A and A' to allow for relative changes in pitch of each vessel while at the same time inhibiting yawing and rolling motions of the vessels with respect to one another. The invention may be deployed with a variety of other connection mechanisms between individual vessels that form the ship. For example, in lieu of the coupling 50 connecting the vessels 14, vessels could be connected to one another in a tandem arrangement with substantial separation distances between the hulls of adjacent vessels. In such implementations, the connection mechanism may be of a type which allows a limited rotational degree of freedom, similar to the rotational geometry of the mechanisms 50, to permit changes in pitch. However, still other designs are contemplated, e.g., including designs which allow for changes in both pitch and yaw but not roll, or even a conventional ball joint design which allows for changes in pitch, yaw and roll. Depending on the intended use of the ship, such alternate configurations may be preferred. For example, a coupling which allows for changes in yaw and roll could facilitate manueverability of the ship 10 operating as a SES along narrow inland waterways. Further, coupling mechanisms may be designed to selectively allow varied degrees of freedom about the couplings among individual vessels during operation of the ship. In SES applications, with connected vessels having respective hulls spaced-apart substantially, e.g., by a meter, the opening between the vessels can be sealed with flexible, e.g., bellows-like, materials to assure that the chamber beneath the hull can be suitably and sufficiently sealed to provide positive pressure needed to experience on-cushion movement.

Reference to a pin or a hinge-like coupling and, generally, reference to the mechanism 50, is not at all limiting of the designs which can effect coupling of vessels according to the invention. Many components of varied design may be incorporated to perform similar or additional coupling functions between vessels. There may be rotation with limited degrees of freedom or all degrees of freedom to allow motion about each interface between coupled vessels. For example, a design may allow for only changes in pitch, for changes in pitch and yaw, or changes involving other combinations of degrees of freedom. When the ship 10 is configured to be operated as an SES the couplings between vessels in the ship may have three degrees of freedom as, for example, might be effected with a ball joint. There may be applications in which translational degrees of freedom are desired in addition to or in lieu of one or more rotational degrees of freedom. Numerous other variations, changes and substitutions may be made without departing from the scope of the invention. Accordingly, the invention is only limited by the claims which follow.

The invention claimed is:

1. A method of operating a ship, comprising:
providing multiple vessels over water with each having a hull section defining a cavity extending between a fore portion of the vessel and an aft portion of the vessel with portions of the hull section extending along starboard and port sides to define walls extending into the water to define first and second opposing walls along the cavity while the cavity extends to a first opening in the hull section positioned along the fore portion of the vessel and to a second opening in the hull section positioned along the aft portion of the vessel;
providing a single chamber among cavities by joining the first opening in the hull section of a first of the vessels to a second opening in the hull section of a second of the vessels; and
providing a gaseous fluid flow into one cavity and allowing the flow to extend through one or more of the cavity openings, resulting in a positive air pressure within two or more of the cavities relative to atmospheric pressure outside the hull sections wherein two or more of the vessels, when in level trim, generally occupy a first draft in the absence of the gaseous fluid flow and a second draft during times when the positive air pressure is present in cavities of said two or more vessels.

2. The method of claim 1 further including providing a seal about the first opening of one of the vessels and providing a seal about the second opening of another of the vessels and positioning the seals at opposing ends of the chamber to substantially enclose the chamber.

3. A method of operating a ship, comprising:
providing multiple vessels over water with each having a hull section defining a cavity extending between a fore portion of the vessel and an aft portion of the vessel with portions of the hull section extending along starboard and port sides to define walls extending into the water to define first and second opposing walls along the cavity while the cavity extends to a first opening in the hull section positioned along the fore portion of the vessel and to a second opening in the hull section positioned along the aft portion of the vessel;
providing a single chamber among cavities by joining the first opening in the hull section of a first of the vessels to a second opening in the hull section of a second of the vessels; and
providing a gaseous fluid flow into one cavity and allowing the flow to extend through one or more of the cavity openings, resulting in a positive air pressure within two or more of the cavities relative to atmospheric pressure outside the hull sections wherein, for a given trim, two or more of the vessels generally occupy a first draft in the absence of the gaseous fluid flow and a second draft smaller than the first draft during times when the positive air pressure is present in cavities of said two or more vessels.

4. A method of operating a ship, comprising:
providing multiple vessels over water with each having a hull section defining a cavity extending between a fore portion of the vessel and an aft portion of the vessel with portions of the hull section extending along starboard and port sides to define walls extending into the water to define first and second opposing walls along the cavity while the cavity extends to a first opening in the hull section positioned along the fore portion of the vessel and to a second opening in the hull section positioned along the aft portion of the vessel;
providing a single chamber among cavities by joining the first opening in the hull section of a first of the vessels to a second opening in the hull section of a second of the vessels; and
providing a gaseous fluid flow into one cavity and allowing the flow to extend through one or more of the cavity openings, wherein each vessel, in conjunction with each other vessel, is operated as a surface effect vessel and, collectively, all of the vessels are moveable through the water under the same steering and control.

5. The method of claim 4 wherein each vessel is flexibly connected to another vessel through a coupling having a single rotational degree of freedom about an axis and each of the vessels is allowed to undergo variations in pitch and to undergo heave oscillations about each associated coupling axis.

6. A ship, comprising:
a power system;
a plurality of vessels each capable of occupying a first draft when afloat without aid of the power system and a second draft smaller than the first draft with aid of the power system; and
multiple coupling mechanisms each operable to connect one vessel to another vessel so that the plurality of vessels can form a single assembly and so power can be transferred between vessels to move the vessels through water in a tandem arrangement, wherein the power system is coupled to provide lift and propulsion to the vessels and wherein a portion of the power system providing lift comprises a power plant positioned on one vessel and another portion of the power system providing propulsion is positioned on a second of the vessels.

7. The ship of claim 6 wherein each vessel comprises at least two spaced-apart hull sections each defining a cavity when the vessel is afloat and when connected to one another the plurality of vessels provide a series of interconnected cavities forming a chamber.

8. A ship, comprising:
a power system;

a plurality of vessels each capable of occupying a first draft when afloat without aid of the power system and a second draft smaller than the first draft with aid of the power system; and multiple coupling mechanisms each operable to connect one vessel to another vessel so that the plurality of vessels can form a single assembly and so power can be transferred between vessels to move the vessels through water in a tandem arrangement, wherein each vessel comprises at least two spaced-apart hull sections each defining a cavity when the vessel is afloat and when connected to one another the plurality of vessels provide a series of interconnected cavities forming a chamber, and the power system comprises at least one power plant positioned on one vessel to propel multiple ones of the vessels and inject an air flow into the cavity of said one vessel to provide lift to multiple ones of the vessels.

9. The ship of claim 8 wherein the vessels are arranged in a tandem series with a first of the vessels in the series including a forward flexible seal and a last of the vessels in the series including an aft flexible seal, with the combination of the seals and the spaced-apart hull sections of each vessel enabling provision of pressurized air within the chamber.

10. The ship of claim 8 wherein each vessel comprises a pair of spaced-apart hull sections defining opposing walls along the vessel cavity.

11. The ship of claim 10 wherein each hull section on each vessel forms a portion of a coupling mechanism allowing fore portions of hulls to be connected to aft portions of hulls on other vessels.

12. The ship of claim 8 wherein a plurality of the coupling mechanisms each enable a fore region of a hull on one vessel to be hinged directly to an aft regions of a hull on an adjoining vessel.

* * * * *